United States Patent
Hobrough et al.

[15] 3,687,547
[45] Aug. 29, 1972

[54] PHOTO POSITIONING SYSTEM

[72] Inventors: Gilbert L. Hobrough, Vancouver; George A. Wood, North Vancouver, both of British Columbia, Canada

[73] Assignee: Hobrough Limited, Vancouver, British Columbia, Canada

[22] Filed: June 8, 1970

[21] Appl. No.: 44,305

[52] U.S. Cl. ..................................................355/75
[51] Int. Cl. ............................................G03b 27/62
[58] Field of Search................355/53, 54, 72, 74, 75

[56] References Cited

UNITED STATES PATENTS

| | | |
|---|---|---|
| 2,763,182 | 9/1956 | Urban et al..................355/54 |
| 3,572,926 | 3/1971 | Coil et al. ...................355/53 |
| 3,449,048 | 6/1969 | Allison.....................355/75 X |

FOREIGN PATENTS OR APPLICATIONS

| | | |
|---|---|---|
| 967,563 | 3/1950 | France.........................355/75 |

OTHER PUBLICATIONS

Ryan, W. J., "X-Y Alignment Table," IBM Technical Disclosure Bulletin, Vol. 10, No. 7, Dec. 1967, pp. 1008- 1009

Primary Examiner—Joseph F. Peters, Jr.
Attorney—Christensen & Sanborn

[57] ABSTRACT

A system is described which accurately positions a photograph in an electronic photo scanning system. A frame for holding the photograph is provided with first and second surfaces which intersect at an angle of 90°. First and second drive members having pairs of rollers engaged with these surfaces each have drive racks extending perpendicular from the surfaces so that electric drive motors coupled with the racks will serve to move the frame and thereby position any selected portion of the photograph over the scanning device. Geometric relationships and construction details are disclosed.

10 Claims, 4 Drawing Figures

PATENTED AUG 29 1972 3,687,547

INVENTORS;
GILBERT L. HOBROUGH
GEORGE A. WOOD
BY Christensen, Sanborn
& Matthews
ATTORNEYS

INVENTORS;
GILBERT L. HOBROUGH
GEORGE A. WOOD

PHOTO POSITIONING SYSTEM

Various types of systems are known to the art of photogrammetry for selectively positioning photographs for the inspection thereof. In one such system a pair of image scanning devices such as vidicon scanners are held in fixed positions while a stereo pair of photographs are appropriately positioned to achieve the requisite image registration. A closed loop control system responsive to registration error signals provides the drive signals used to reduce the registration errors. In such systems it is important to have a responsive photograph positioning apparatus capable of rapidly and accurately moving a photograph to a position where any selected portion thereof is aligned with the scanning device. It is thus an object of the present invention to provide such a photograph positioning system.

Another object of the present invention is to provide an improved object positioning system which is capable of moving an object such as a photograph to present any selected portion thereof in a position of alignment with a scanning device.

An additional object of the present invention is to provide an improved photograph scanning system which incorporates a simplified and highly accurate photograph positioning apparatus. Another object is to provide such a system wherein sensitivity to rotational errors is minimized.

The above and additional advantages and objects are achieved through the use of a positioning system wherein the photograph is carried by a frame assembly positioned for movement on a flat support surface. A photo scanning device such as a vidicon is aligned with an opening in the support surface and is adapted to scan the portion of the photograph aligned with the opening. First and second sides of the photo holding frame are accurately machined as flat surfaces which intersect at an angle of 90°. A pair of toothed rack elements each carry at on end thereof a frame abutting end member with each such end member having a pair of rollers maintained in engagement with an associated one of said flat side surfaces of the frame assembly. The racks extend from the abutting end members in a manner such that the racks extend perpendicular from the edge of the frame. These racks are each driven by a drive gear carried on the end of the drive shafts of a pair of electric step motors. These step motors receive the input signals for positioning of the photograph.

A flexible cable and weight assembly connected to the frame maintains the frame in constant engagement with the rollers of the drive members. Thus the drive racks always extend perpendicular from the sides of the frame. The arrangement of the drive racks, the frame, and the scanning vidicon is such that the center of rotation for the system corresponds to the center of interest being scanned by the vidicon. This point is located on the intersection of the lines of drive for the racks. The system has a cosine error function and thus is less sensitive to rotational errors which otherwise tend to present a problem in a photo positioning system.

The above and additional advantages and objects will be more clearly understood from the following description when read with reference to the accompanying drawings.

Figure 1:
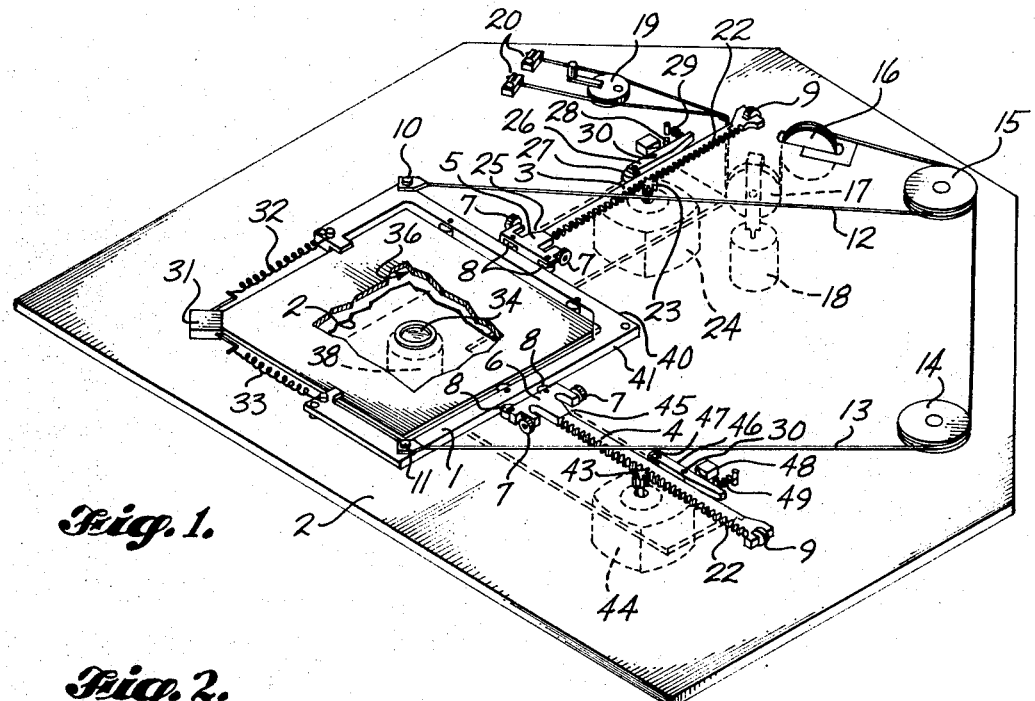
FIG. 1 is a perspective view of a preferred embodiment of the invention showing the drive motors and vidicon assembly located beneath a flat plate.

Turning now to the drawings there is illustrated in FIG. 1 a frame assembly 1 adapted to hold a photograph which is to be scanned. The photo holding frame rests upon a flat base assembly which includes the plate 2. The frame is provided with suitable bearing surfaces to provide easy movement of the frame across the plate. Nylatron pads 42 were used on the underside of one frame assembly and were found to work well. A pair of geared driving racks 3 and 4 each carry at one of their ends a frame engaging end member 5 and 6, respectively. These members 5 and 6 each carry a pair of rollers 7 which rotate about horizontal axes and ride on the upper surface of the plate 2. Second pairs of rollers 8 supported for rotation about vertical axes in each of the members 5 and 6 engage the edges 1A and 1B of the photo holding frame. The outer ends of the racks 3 and 4 are supported by rollers 9.

The edges 1A and 1B of the photo holding frame are flat surfaces which intersect at an angle of 90° for the particular system illustrated herein. The racks 3 and 4 are are maintained perpendicular to the surfaces 1A and 1B and therefore the racks if extended would intersect at an angle of 90°. This is illustrated in Figures 2 and 3 by the lines 37 and 38 which run through the pitch line of the respective geared racks.

The frame which holds the photograph is maintained in engagement with each of the rollers 8 by any suitable assembly. In the preferred embodiment illustrated in FIGS. 1 and 2 the opposite corners 10 and 11 of the frame 1 have the ends of the cables 12 and 13 secured thereto. Cable 13 passes around the guide 14 supported by post 14A on plate 2, and then around guide 15 supported by post 15A on the plate 2. In a similar manner the cable 12 passes around the guide 15. The two cables extend from guide 15 around the guide 16 supported for rotation about a horizontal support located in the plane of the plate 2, through the opening in the plate 2 adjacent guide 16, and around the pulley 17 having the weight 18 secured thereto. From pulley 17 the cables extend through the opening 2A in the plate 2, around the adjustment eccentric 19, and are secured by their respective ends to the clamps 20 secured to the top of the plate 2. The arrangement is such that the weight 18 acting through the cables 12 and 13 provides a yielding force to the frame 1 which urges the edges 1A and 1B into engagement with the rollers 8 associated with drive racks 3 and 4. Rotation of the eccentric 19 is used for initial adjustment of the cables.

A drive gear 23 secured to he drive shaft of a reversible electric step motor 24 engages the rack 3. In a similar manner the drive gear 43 secured to the output drive shaft of a second reversible electric step motor 44 engages the drive rack 4. At each end of the permitted travel of the racks 3 and 4 the operation of the reversible electric step motors is interrupted by operation of an associated control switch by the arms 26 and 46 having rollers 27 and 47 engaged with the non-toothed edge of the of the associated rack 3 or 4. The arms 26 and 46 are pivoted on pins 26A and 46A secured to plate 2. The arms are urged toward the associated rack by the springs 29 and 49. The switches 28 and 48 associated with the arms 26 and 46 are adapted to be operated whenever the control arm is moved clockwise. The end members 5 and 6 on the racks 3 and 4 have beveled surfaces 25 and 45 which engage the rollers 27 and 47 whenever the racks reach their maximum extent of outward movement. Thus the associated switch will be actuated to interrupt further drive of the rack. The beveled surfaces 3A and 4A on the outer ends of racks 3 and 4 serve the same purpose when the maximum extent of inward travel has been reached.

Figure 2:
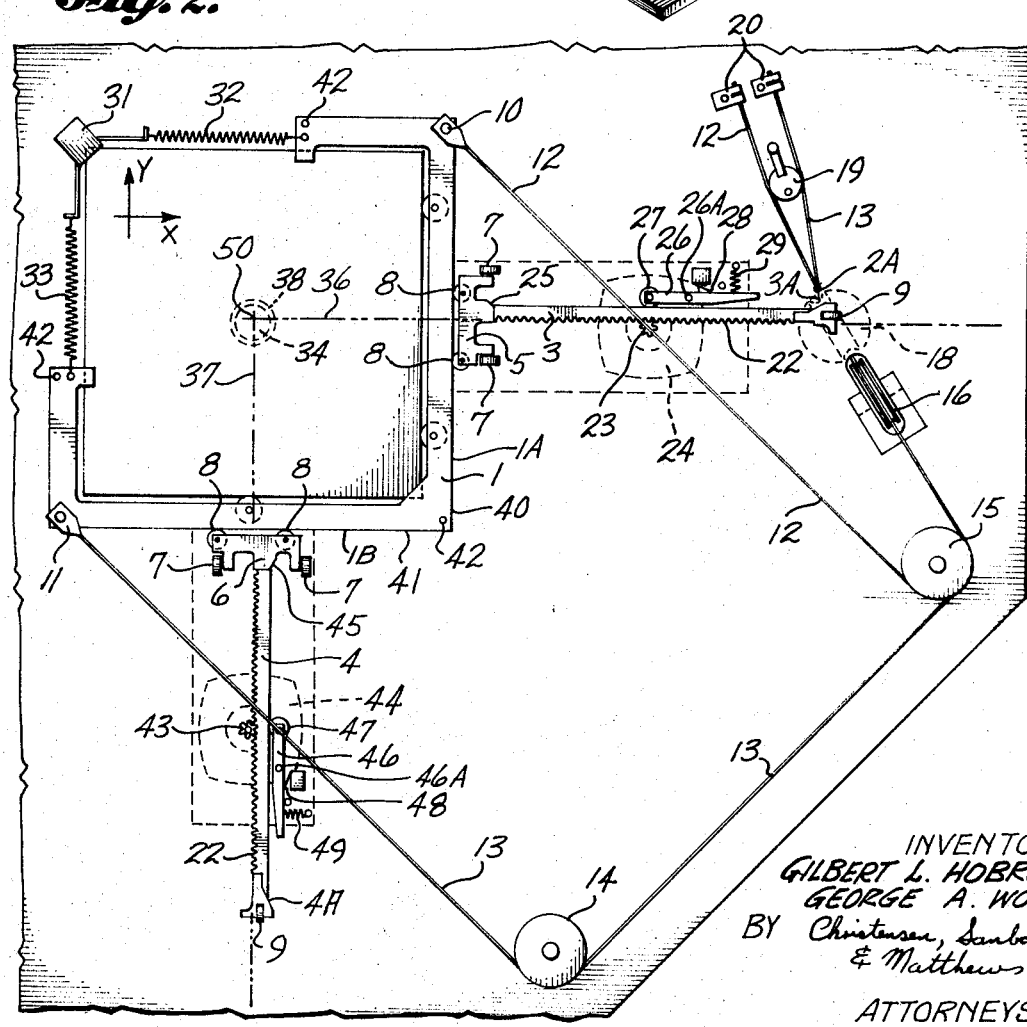
FIG. 2 is a plan view of the apparatus illustrated in FIG. 1.
Figure 3:
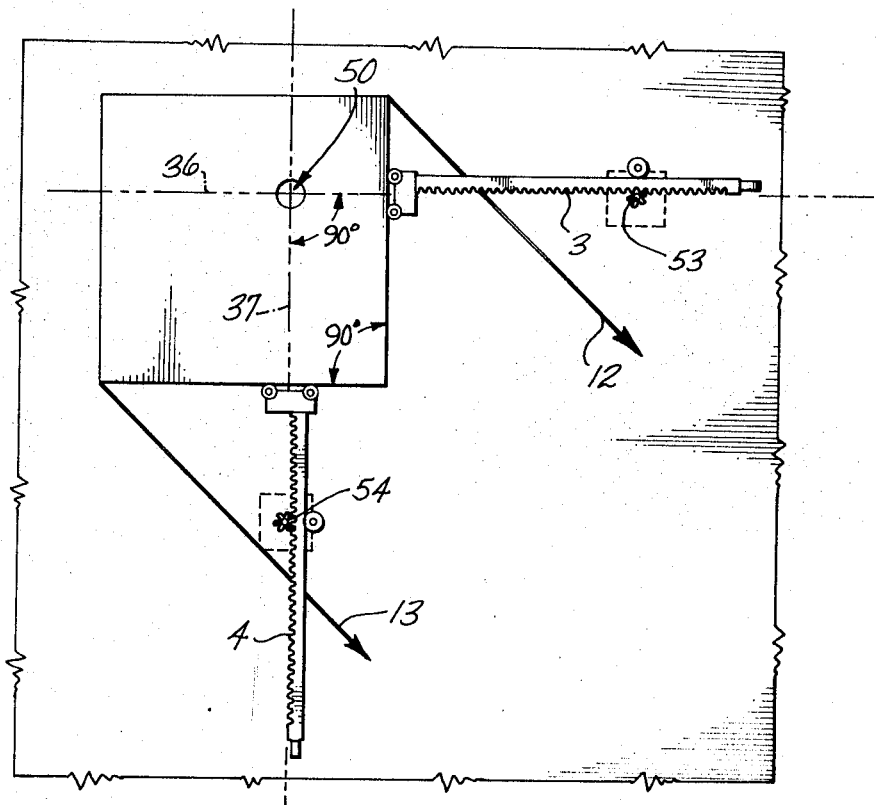
FIG. 3 is a diagrammatic illustration of the apparatus of FIGS. 1 and 2 illustrating certain geometric relationships.
Figure 4:
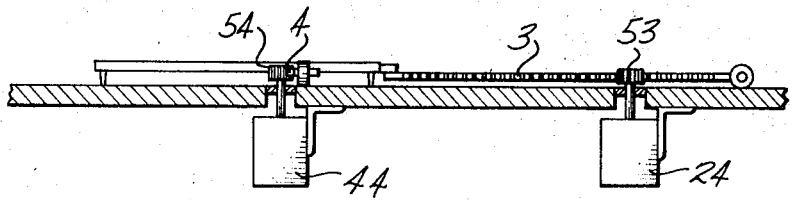
FIG. 4 is an elevation of the apparatus of FIG. 3.

As seen in FIGS. 1 and 2 the lens of the vidicon 38 is aligned with the opening 34 in the plate 2 so that the point identified as the center of interest or inspection point 50 is under observation. As seen in FIGS. 2 and 3 the center of interest coincides with the intersection of the two lines 36 and 37 which extend perpendicular from edge surfaces 1A and 1B to the pitch lines of the gears 23 and 43. In the system shown these two lines therefore coincide with the pitch lines of the drive racks 3 and 4. It will be seen in FIG. 3 that the point of rotation 53 for rack assembly 3 is on the pitch line of gear 23 and hence is on line 36. In a similar manner the point of rotation 54 for the rack assembly 4 is on the pitch line of gear 43 and hence is on line 37. With this arrangement the center of interest 50 therefore coincides with the center of rotation for the system and rotational errors are minimized.

The photograph can be held in position in the frame 1 by various means. For purposes of illustration a corner stay 31 is shown as being engaged with the corner of the photograph with springs 32 and 33 urging the corner stay 31 and photograph toward the opposite corner of the frame.

The vertical center of the drive racks 3 and 4 are maintained in the same plane as the emulsion of the photograph. Thus in using the apparatus the photograph is placed on the frame with the emulsion side down.

There has thus been disclosed an improved object positioning system which is particularly useful for positioning a photograph. The system disclosed herein has been found capable of accurate positioning of a photograph by incremental "X" and "Y" distances of approximately one micron. It can be shown that positional errors due to rotation are a cosine function. The system is therefore virtually non-sensitive to rotational errors.

What is claimed is:

1. An object positioning system comprising in combination: object holding means including a frame having first and second drive surfaces maintained at an angle of 90° with respect to each other; a first drive member extending perpendicular from and engaged with said first drive surface; a second drive member extending perpendicular from and engaged with said second drive surface; first and second drive motors respectively engaged with said first and second drive members and adapted to apply positional forces to said frame via said drive members, said drive members including means permitting rotational adjustment of said frame, the engagement of said drive members with the respective drive motors providing first and second lines of drive which are perpendicular to said first and second surfaces and with said lines of drive intersecting at a first point; and substantially planar support means supporting said frame means and said drive members.

2. The apparatus of claim 1 wherein said support means has an observation opening therein aligned with said point of intersection of said lines of drive.

3. A system as defined in claim 1 wherein said drive motors are adapted to drive said frame in first and second perpendicular directions along said lines of drive, and tension means yieldingly urging said frame in directions opposite to said first and second directions to maintain said frame in engagement with said drive members.

4. The apparatus of claim 1 wherein said first and second drive members include first and second geared racks, and each of said drive motors includes a drive gear engaged with the associated geared rack.

5. The apparatus of claim 4 wherein each of said geared racks includes a frame engaging member secured to one end thereof, each of said frame engaging members having first and second rollers respectively engaged with one of said drive surfaces.

6. The apparatus defined in claim 5 including means supporting said drive motors beneath the surface of said planar support member.

7. A photo positioning system comprising in combination: frame means for holding a photo and having first and second substantially flat drive surfaces aligned at an angle of 90° to each other; first and second drive motors each having an output drive shaft, a first drive member extending from said first drive motor to said first drive surface, said first drive member being engaged with said first drive surface and including means for applying drive forces thereto from said first motor along a first line which is perpendicular to said first drive surface, said first drive member being rotatable about said first motor in a plane perpendicular to said output drive shaft; a second drive member extending from said second drive motor to said second drive surface; said second drive member being engaged with said second drive surface and including means for applying drive forces thereto from said second motor along a second line which is perpendicular to said second drive surface, said second drive member being rotatable about said second motor in a plane perpendicular to said output drive shaft; and planar support means supporting said frame means and said drive members on the upper surface thereof and having means defining an observation point located at the intersection of said first and second lines.

8. The system of claim 7 wherein said drive members each include a geared rack means having means on one end thereof engaged with the associated drive surface permitting un-restrained relative movement between the rack and the frame, and tension means yieldingly urging the frame into engagement with said rack means.

9. An object positioning system comprising in combination: object holding means including a frame having first and second drive surfaces maintained at an angle of 90° with respect to each other; a first drive member extending perpendicular from and engaged with said first drive surface; a second drive member extending perpendicular from and engaged with said second drive surface; first and second drive motors respectively engaged with said first and second drive members and adapted to apply positional forces to said frame via said drive members, said drive motors adapted to drive said frame in first and second perpendicular directions along said lines of drive, and tension means yieldingly urging said frame in directions opposite to said first and second directions to maintain said frame in engagement with said drive members, said tension means including cable means secured to said frame means, and means applying a force to said cable means for urging said frame means into engagement with the outer ends of said drive members; the engagement of said drive members with the respective drive motors providing first and second surfaces and with said lines of drive intersecting at a first point; and substantially planar support means supporting said frame means and said drive members.

10. The apparatus of claim 9 wherein said cable means includes first and second sections of cable respectively secured to said frame means, said means applying a force includes a weight member suspended from a portion of each of said cables, and adjustment means engaged with each of said sections of cable and operative to produce relative movement therebetween.

* * * * *